United States Patent [19]

Tübke

[11] Patent Number: 5,042,862
[45] Date of Patent: Aug. 27, 1991

[54] GRIPPING DEVICE

[75] Inventor: Axel B. Tübke, Berlin, Fed. Rep. of Germany

[73] Assignee: System GmbH, Düsseldorf, Fed. Rep. of Germany

[21] Appl. No.: 456,684

[22] Filed: Dec. 28, 1989

[30] Foreign Application Priority Data

Dec. 31, 1988 [DE] Fed. Rep. of Germany ....... 3844503

[51] Int. Cl.$^5$ ...................... B25J 15/08; B65G 61/00
[52] U.S. Cl. ................... 294/86.4; 294/67.22; 294/103.1; 294/104; 414/622; 414/790.2; 414/907; 901/39
[58] Field of Search ............ 294/11, 34, 67.2, 67.22, 294/67.3, 86.4, 86.41, 88, 101, 103.1, 104; 414/621–623, 672, 740, 741, 790.2, 797.9, 907; 901/31, 32, 36–49

[56] References Cited

U.S. PATENT DOCUMENTS

| 2,243,305 | 5/1941 | Adler | 294/103.1 X |
| 2,412,627 | 12/1946 | McGowan | 294/104 |
| 4,240,657 | 12/1980 | Feighery | 294/103.1 X |
| 4,383,788 | 5/1983 | Sylvander | 414/907 X |
| 4,647,265 | 3/1987 | Uno | 414/790.2 |
| 4,696,501 | 9/1987 | Webb | 294/103.1 X |
| 4,781,509 | 11/1988 | Evans | 294/67.22 X |
| 4,787,810 | 11/1988 | Cawley et al. | 414/622 X |

FOREIGN PATENT DOCUMENTS

| 3024112 | 2/1982 | Fed. Rep. of Germany . | |
| 3221351 | 12/1983 | Fed. Rep. of Germany . | |
| 224533 | 7/1985 | Fed. Rep. of Germany . | |
| 8631725 | 4/1987 | Fed. Rep. of Germany . | |
| 2141636 | 1/1973 | France . | |
| 2417465 | 10/1979 | France | 294/67.22 |
| 2583730 | 12/1986 | France | 294/67.22 |
| 600068 | 3/1978 | U.S.S.R. | 294/67.22 |
| 1240579 | 6/1986 | U.S.S.R. | 901/39 |
| 2194769 | 3/1988 | United Kingdom | 294/67.22 |
| 8607579 | 12/1986 | World Int. Prop. O. . | |

Primary Examiner—Johnny D. Cherry
Attorney, Agent, or Firm—Spencer & Frank

[57] ABSTRACT

A gripping device for transporting a stack of flexible sheets includes two substantially horizontally spaced, parallel tines arranged for supporting the stack; and a counterelement supported above the tines in alignment with the spacing therebetween. The counterelement has a horizontal dimension in a direction parallel to the spacing between the two tines. A horizontal dimension is smaller than the spacing between the two tines. A device moves the counterelement substantially vertically towards or away from the tines. When an unstabilized stack of flexible sheets is received on the two tines and the counterelement is moved towards the two tines for gripping and stabilizing the stack therebetween, the counterelement and the two tines produce a curvilinear bending in the stack about a horizontal axis oriented parallel to the two tines when the counterelement is moved past an initial plane containing a top layer of the unstabilized stack.

12 Claims, 6 Drawing Sheets

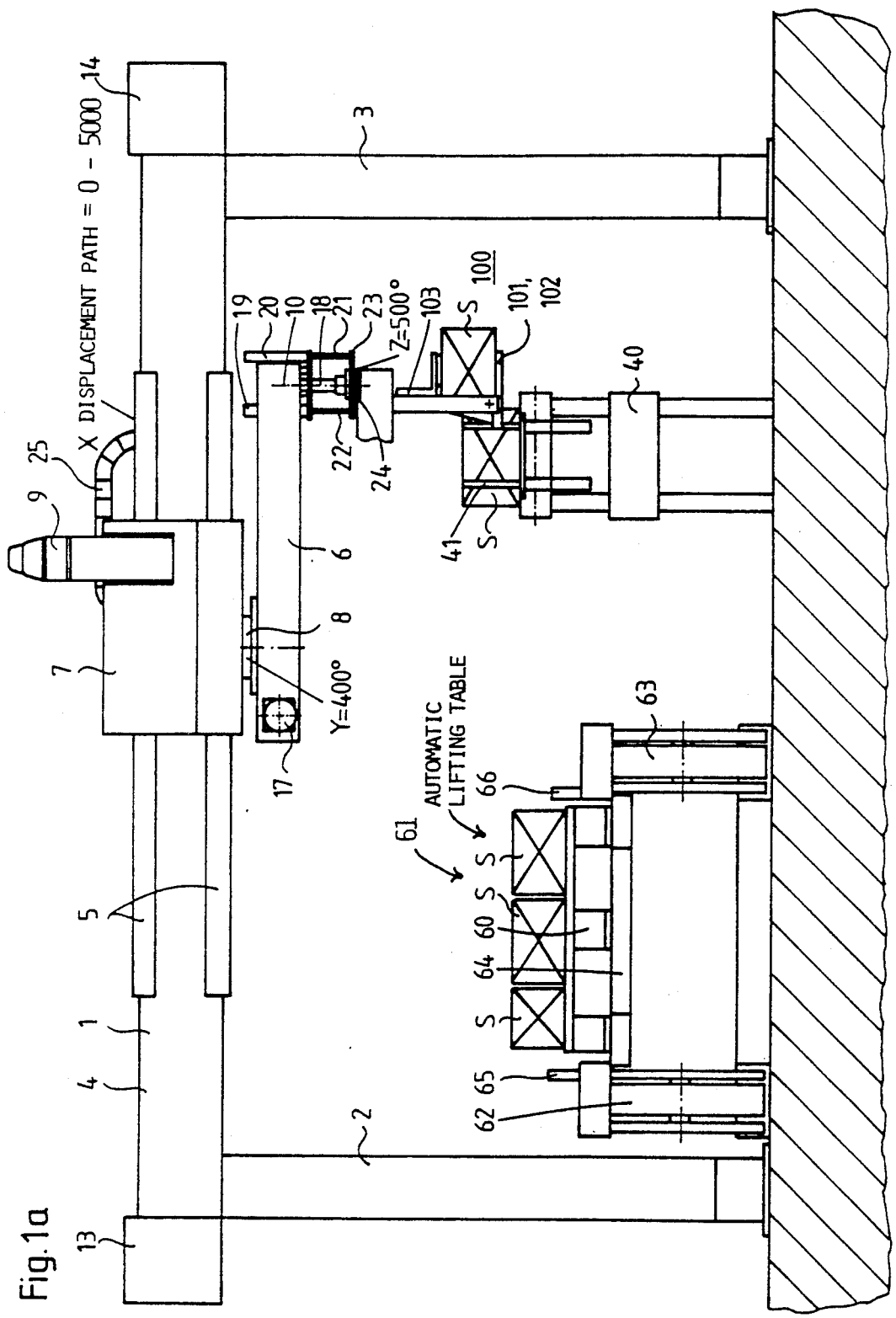

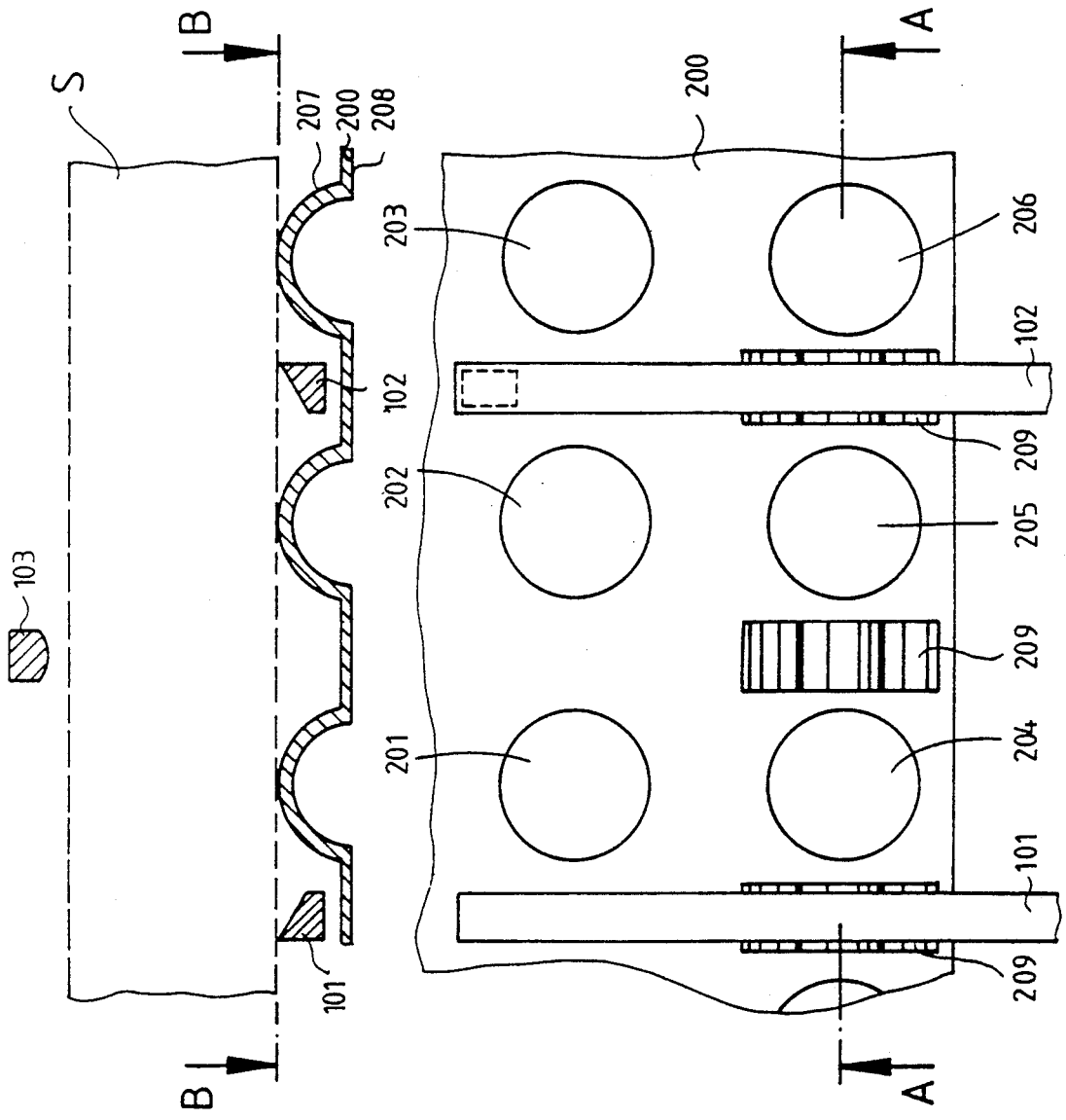

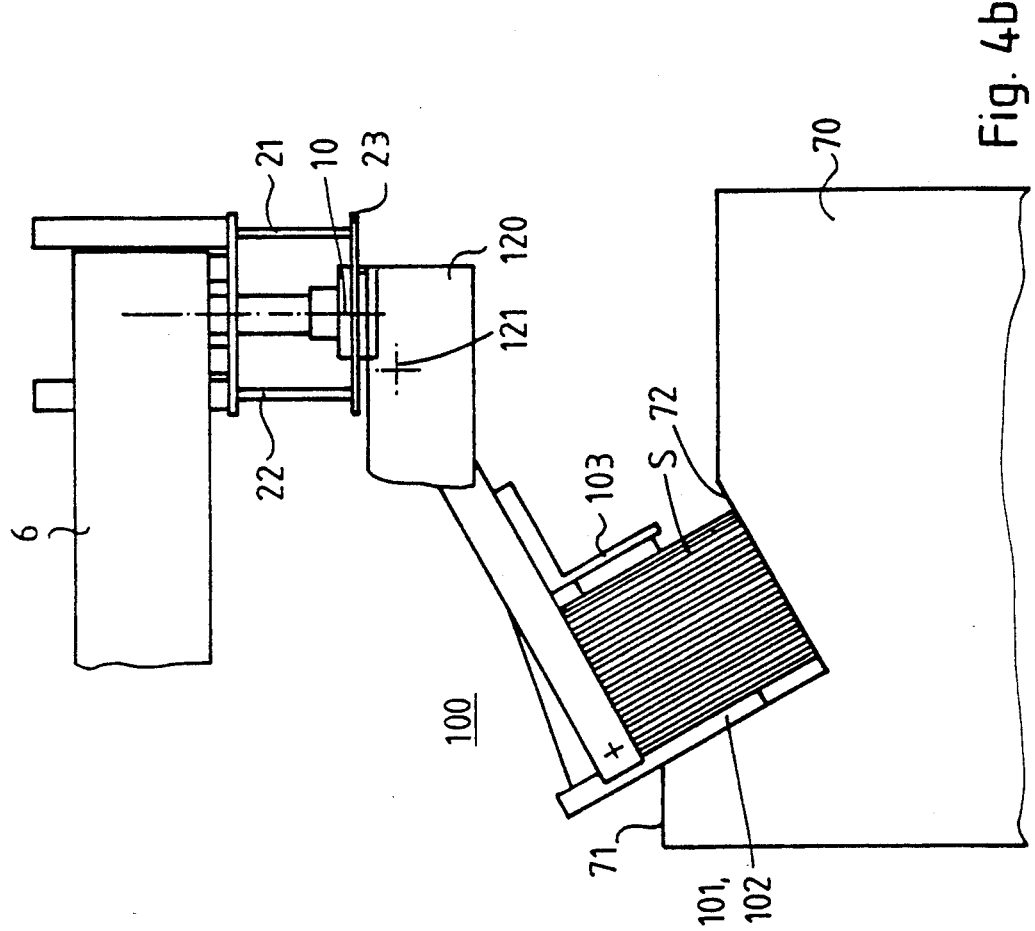
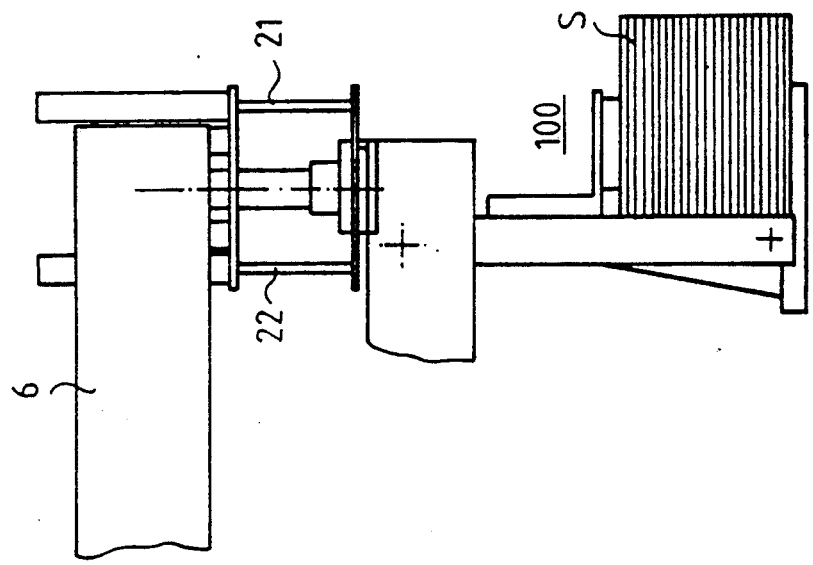
Fig. 4b
Fig. 4a

GRIPPING DEVICE

CROSS REFERENCE TO RELATED APPLICATIONS

This application relates to subject matter disclosed in application Ser. Nos. 07/456,683 and 07/456,690, both filed on Dec. 28, 1989.

The invention relates to a gripping device or the type for transporting a stack of thin flexible sheets or a stack of stapled material for an automatic material handling device. The gripping device includes two times defining spaced apart supporting elements which are substantially horizontal. A movable counterelement is displaceable substantially perpendicularly to the two supporting tines for pressing against the top surface of a stack of material when it is gripped.

Such a gripping device for a palletizing robot is disclosed in DE 31 02 431 (Federal Republic of Germany printed unexamined application) which is a counterpart of U.S. Pat. No. 4,383,788 to Sylvander. The prior art robot has a structure similar to an industrial robot with an accessory device for gripping packets. It is configured as a stand-alone unit having an arm which is pivotal about a central base and to whose end the gripper is fastened. This gripper includes two lower tines and one upper counterelement configured as a pressure plate which, when gripping a stack, moves in the direction toward the lower tines and compresses the stack.

The drawback is that the lower tines must have a length which essentially corresponds to the transverse dimension of the respective stack in order to keep the latter stable if it does not have the required inherent stability. This brings about the further drawback that for different stack sizes different grippers must be employed as tines that project beyond small stacks would prevent them from being deposited in close proximity to one another.

Another gripping device for transporting, in particular, stacked paper bags or cut paper tubes is disclosed in DE 3,221,351.A1 (Federal Republic of Germany patent document). The gripping device includes a horizontal fixed base plate and a clamping cylinder disposed opposite the base plate. The clamping cylinder is guided on a vertical guide so as to be displaceable and arrestable relative to the base plate. The gripping device further includes supporting arms disposed below the base plate and pivotal about vertical axes. These arms can thus be pivoted from a position next to a stack. The gripping device can be moved transversely to the stack and underneath the stack.

This configuration has the drawback that, during gripping and particularly while depositing stacks of thin sheets, the latter slip and may possibly be damaged by the pivoting movement of the supporting arms. Transport without damage can therefore not be ensured with this gripping device, particularly in connection with stacks of thin sheets of paper. Moreover, the supporting arms must have a length which essentially corresponds to the respective transverse dimension of the stack so as to keep the stack stable unless it has the necessary inherent stability. In this prior art embodiment as well, different stack base surfaces require correspondingly dimensioned supporting arms. Particularly the arrangement of supporting arms that can be pivoted inwardly takes up much space so that the range of use of the gripping device during manipulations in close quarters is limited. Another drawback is the high expenditure for controls given that, on the one hand, the gripping device as a whole, the clamping cylinder, and the pivot arms must be acutuated in accordance with the process.

SUMMARY OF THE INVENTION

It is an object of the invention to permit, in a gripping device of the above-mentioned type, stable holding and secure transport by means of gripping tines which are substantially shorter than the transverse dimension of the stack, even if such a stack is made of flexible sheet-type material.

This object is accomplished by the features of a gripping device for transporting a stack of thin flexible sheets or a stack of stapled material for an automatic handling device, the gripping device comprising a housing and two spaced apart tines attached to the housing. The two tines define spaced supporting elements which are oriented substantially horizontally and parallel to each other. A counterelement is movably attached to the housing and has a horizontal dimension in a direction parallel to the spacing of the two tines that is smaller than the spacing between the tines. A drive member attached to the housing moves the counterelement substantially vertically and perpendicularly to the two tines in a direction towards the two tines. Thus, when an unstabilized stack of thin flexible sheets or an unstabilized stack of stapled material is received on the two tines and the counterelements is moved towards the tines for gripping and stabilizing the stack therebetween, the counterelement and the two tines produce a curvilinear bending in the stack about a horizontal axis oriented parallel to the two tines when the counterelement moves past an initial plane containing a top layer of the unstabilized stack for stabilizing the stack.

The invention is based on the realization that the curvature of the stack about an axis oriented parallel to the direction of the tines, as realized by the measures taken, results in a stabilized position of the stack even if the stack includes layers that are not bound together or the stack is high.

A particular advantage of the invention is that the discovered gripper structure can be employed universally with different types of robots and permits quick rearrangement of the material being transported owing to short access times.

In a preferred modification of the invention, the two tines are disposed below the counterelement so that, when a stack of paper or other material is deposited, the center region (which hangs through) is the first to contact the support and the edge regions can drop down very quickly once they are released as, in this way, the air underneath the stack is able to escape without delay. The side regions need undergo no sliding movement, even when they are set down onto the support, which could produce permanent waviness in the bottom layers of the stack.

If the two tines and the counterelement are driven in such a manner that they are able to perform simultaneous relative movements toward one another or away from one another during gripping and releasing, respectively, grasp and release times are also shortened.

Gripping is particularly favorable if the tines are driven to be pivotal about a first rotation axis which is oriented parallel to a connecting line which vertically intersects the first two tines and is shifted in the direction toward the counterelement. Preferably the connection of the tines with the fork rod is provided with a hinge so that the tines are passively pivotal in the direction toward the counterelement but, in the opposite direction, are limited by an abutment when they reach the horizontal position. In this way, in spite of the pivoting movement of the lower tines about a horizontal axis, when the stack is released or before it is gripped, it is ensured that the free ends of the tines will not "scrape" over the support. A corresponding result is also realized by a slight lift of the entire gripper carrier in coordination with the pivoting movement.

An abutment region, which is stationary relative to the movement of the tines and is disposed on the side opposite the free end of the tines, extends in the direction of the first rotation axis and holds the stack in its position by way of laterally stopping it when the lower tines are pivoted rearwardly/downwardly for release so that it is ensured that the stack is deposited in an accurate position.

If the tine cross section is given a sloped configuration, with the slope being in a region of the edge facing the other tines as well as the counterelement, picking up and depositing can also take place in oblique positions, adapted to the respective supplying or pickup station.

Owing to the fact that a reduction in cross section connected with an upper slope is provided toward the free end of the tines, the latter are automatically centered and guided for engagement in closely defined regions.

Given that, in a preferred modification, the gripper is provided with a connecting device in the form of a quick release coupling, it is possible to adapt it to other types of transporting tasks without extensive remodeling work.

BRIEF DESCRIPTION OF THE DRAWINGS

FIG. 1a is a side elevational view of a first embodiment of the invention.

FIG. 1b is a top view of the embodiment of FIG. 1a.

FIG. 3a is a detailed sectional view of intermediate members for supporting the material to be palletized.

FIG. 3b is a top plan view of the intermediate members of FIG. 3a.

FIG. 4a is a partial view of the gripper region of the embodiment of FIG. 1a, on an enlarged scale, in the basic position.

FIG. 4b is a view of the gripper region of FIG. 4a in an inclined position for receiving or depositing a stack.

FIG. 5 is a block circuit diagram of a control circuit for the embodiment of FIG. 1a.

DESCRIPTION OF THE PREFERRED EMBODIMENTS

Figure 1B:
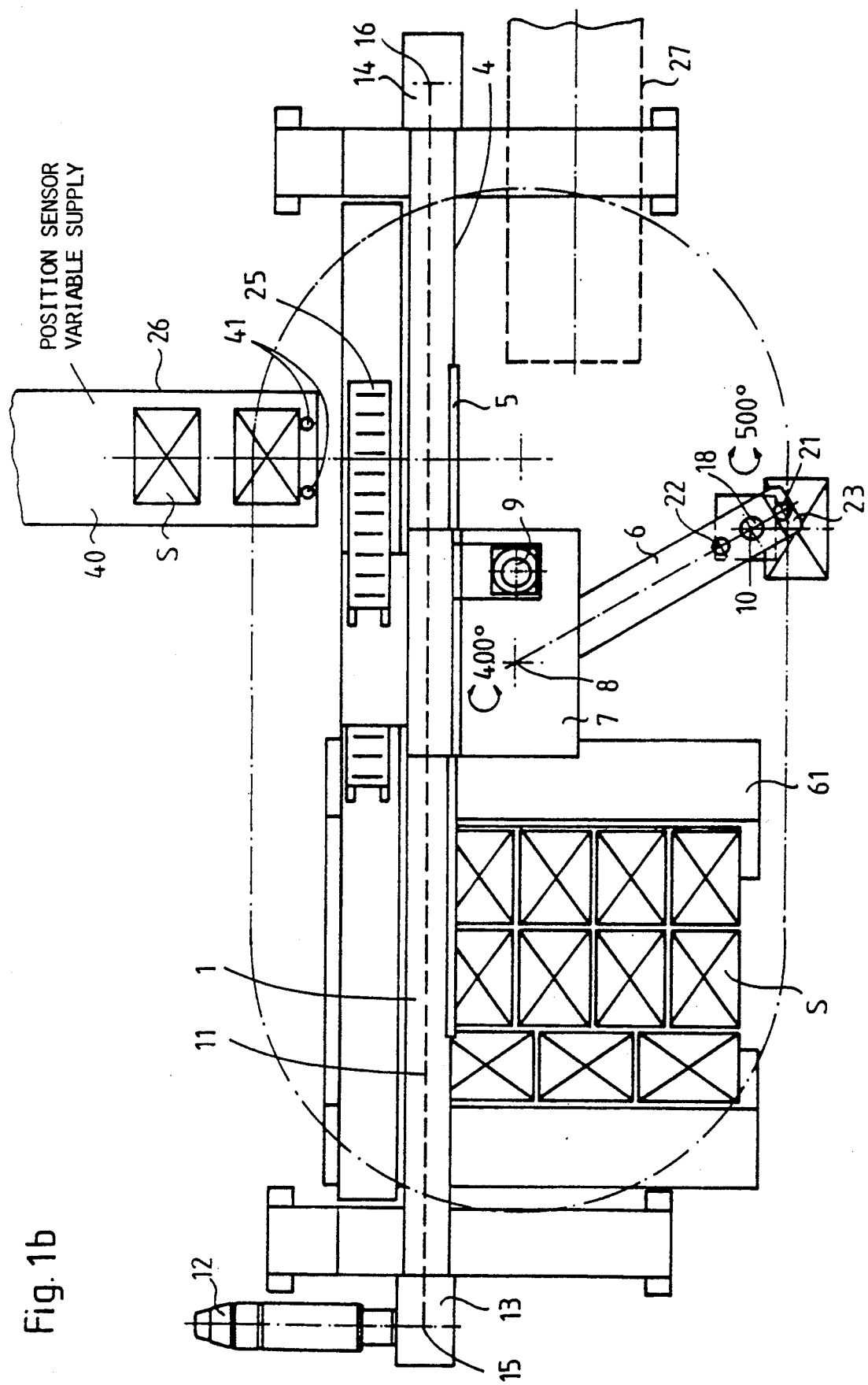

In the side view and top view respectively of the preferred embodiment of the invention shown in FIGS. 1a and 1b, a transverse member 1 extends over the operating range of the device. At its ends, transverse member 1 is connected with two supports 2 and 3 in the form of stands, with supports 2 and 3 having at least the height of the required processing space.

At one side 4 of transverse member 1, a track 5 is provided which has the length of the lateral displacement path of an arm 6. Arm 6, which is suspended from a rotating device 8 so as to be able to rotate over a rotation angle of 400°, is mounted so as to be displaceable by means of a guiding device 7 in the direction of transverse member 1. Rotating device 8 is driven electrically by means of a motor 9 which is screwed to a housing of guiding device 7.

Guiding device 7 receives its actuation for a displacement movement in the direction of transverse member 1 by way is indicated by dashed lines in FIG. 1b, from a motor 12. Toothed belt 11, which extends within transverse member 1, is stretched from the one drive housing 13 accommodating motor 12 to a drive housing 14 which is connected with transverse member 1 at its opposite end. Toothed belt 11 is brought over a toothed wheel 15 at motor 12 to guiding device 7. Toothed belt 11 is connected with guiding device 7 in such a way that movement of toothed belt 11 causes guiding device 7 to move simultaneously. Following guiding device 7, toothed belt 11 extends over a reversal roller 16, which is not visible here and which is mounted in drive housing 14, back to motor 12.

The free end of arm 6 is provided with a rotating device 10 to which is attached a gripping device 100. Rotating device 10 is driven by a motor 17 which is attached to the side of the arm opposite rotating device 10, with the transmission of force from motor 17 to rotating device 10 taking place by way of a further toothed belt. The force is then transmitted further from rotating device 10 by way of a shaft 18 to gripping device 100, with shaft 18 being vertically displaceable by a predetermined amount.

In the vicinity of shaft 18, two lifting rods 21 and 22 are disposed which are associated with two pneumatic cylinders 19 and 20. Pneumatic cylinders 19 and 20 are arranged in parallel and connected with the free end of arm 6. The lifting rods are movable in the direction of gripping device 100. At the ends of lifting rods 21 and 22 opposite pressure cylinders 19 and 20, there is provided a lifting plate 23 which, together with a connecting device 24 of gripping device 100, is connected with shaft 18. The maximum stroke is predetermined by the difference between the retracted position and the maximum extended position of lifting rods 19 and 20.

Guiding device 7, motor 9 and motor 17, as well as the moving device for gripper 100 are linked to the control device by way of a cable strand, with the cable strand being guided in a jointed strip 25 in transverse member 1.

Due to the few joints in the palletizing robot, the palletizing speed is high while a large access range is maintained. Arm 6 is rigid and is preferably aluminum with a box-shaped sectional profile.

The single rotating device 8 of rigid arm 6 which rotates about a vertical axis, together with the horizontal guiding device 7 for the rotatably mounted end of arm 6, permits quick and precise movement of arm 6 together with gripping device 100 over a large range of operation. To compensate for the different deposit and pickup surfaces created by warping or tolerances in the stack heights during palletizing and depalletizing, gripping device 100 is configured so as to be displaceable over a vertical lifting movement of a few centimeters by means of vertically oriented lifting rods 21 and 22. Lifting rods 21 and 22 form a simple auxiliary vertical guide for gripping device 100. Due to the small radius of movement, the vertical compensating movement of gripping device 100 does not adversely influence the high palletizing speed.

FIGS. 1a and 1b show a longitudinal conveyor 40 which supplies a stack S of printed products and which has, at its end, an abutment device 41. The conveyor is disposed in the pivot range of arm 6. Gripping device 100 picks up stack S from the end of longitudinal conveyor 40. The lower first tines 101 and 102 then enter into recesses provided in the longitudinal conveyor below stack S which is disposed at the abutment device. Together with second tine 103, which has the configuration of a pressing jaw, the lower two first tines 101 and 102 compress stack S. Then pressure cylinders 19 and 20 move lifting rods 21 and 22 upwardly until the height of abutment device 41 is overcome. In the illustrated embodiment, stack S may be composed of loose or bound stacks of magazines or products from a gather-stitcher collector/stapler.

The stack is now moved by coordinated movement of guiding device 7, rotating device 8, arm 6, rotating device 10, gripping device 100 and lifting rods 21 and 22 in the direction toward a pallet 60 on a lifting table 61 which can be moved vertically by the desired stack height. Lifting table 61 is accordingly located within the maximum displacement and/or rotation range of the palletizing robot.

Lifting table 61 includes a plate 64 vertically movable between stands 62 and 63 and supporting a pallet 60 on which, in turn, are stacks S. Connected with the stands is a light transmitter 65 and light receiver 66 of a light barrier whose light beam traverses the lifting table at the height of the access range of the lower first tines of the gripper. The light beam is reflected at several reversal points and is guided in such a manner that it covers the entire region of the pallet at a maximum beam distance which is smaller than the smallest transverse dimension of a stack to be monitored. If one layer has been removed, i.e. if during a depalletizing process all conveying processes have been performed for a palletizing pattern, the table is raised by one stack height as a result of the signal emitted by the light barrier given that the light path is now unobstructed. During the palletizing process, once one level has been loaded, plate 64 is lowered according to the palletizing pattern until the light path is unobstructed again.

As shown in FIG. 1b, two possible positions 26 and 27 are given for the longitudinal conveyor. The palletizing takes place according to a predetermined scheme which the robot follows successively and deposits the stacks at the predetermined locations. Lifting table 61 moves downwardly by the height of one stack S whenever a layer of stacks S has been deposited on pallet 60. The process is repeated until the pallet load has reached a desired height. Thereafter, the lifting table is lowered completely and deposits the pallet on a DTS (driverless transporting system), not shown here. The DTS transports the pallet out of the processing room and another DTS moves an empty pallet 60 into lifting table 61 and this transporting process, as part of the so-called "palletizing process," begins anew.

The sequence may also be reversed in the course of depalletizing so that stacks S are moved from pallet 60 to a longitudinal conveyor 40. However, prerequisite of the gripping of stacked material are intermediate members 200 which are described in connection with FIGS. 3a and b.

Figure 2:
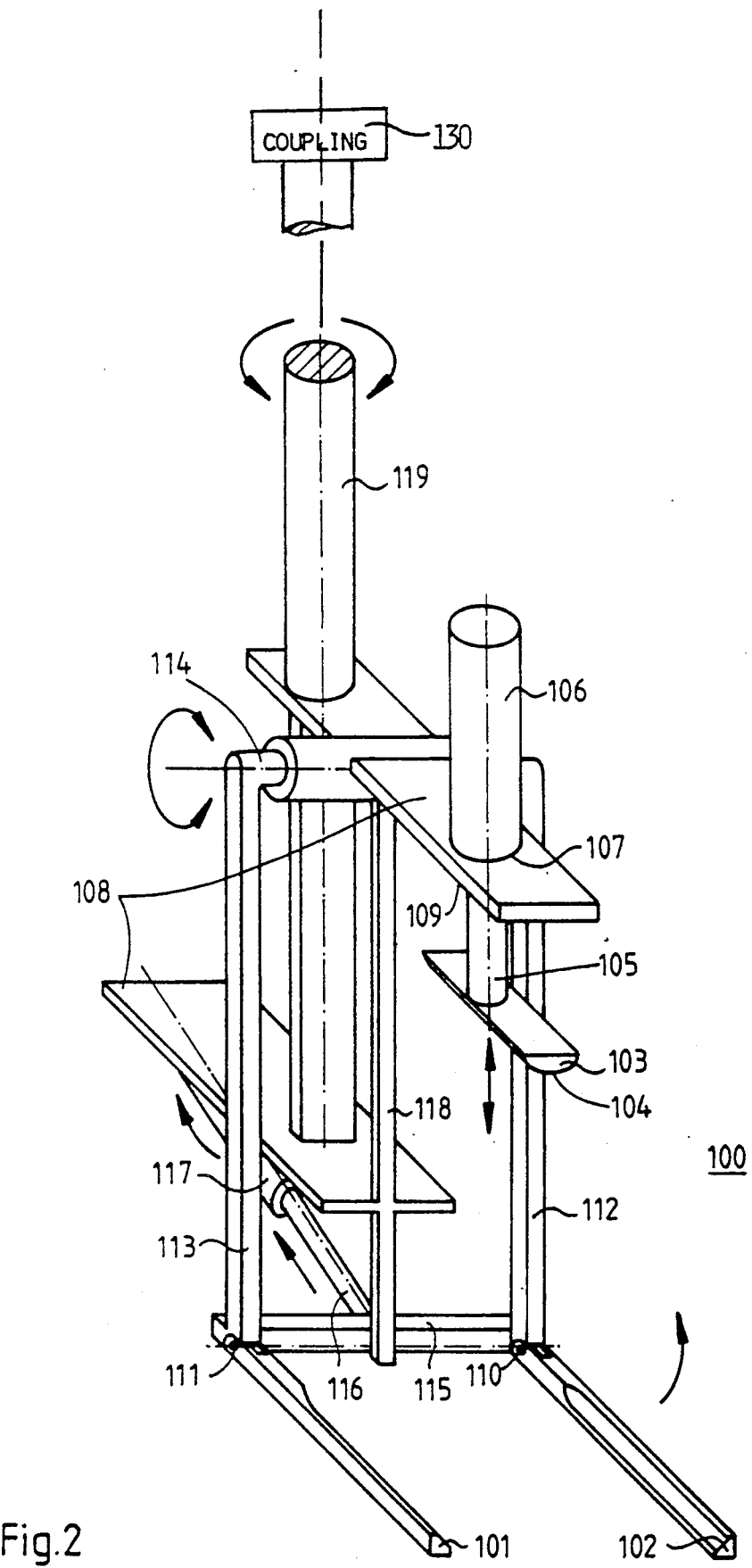
FIG. 2 is a perspective view of a gripper as a detail of the embodiment of FIGS. 1a and 1b on an enlarged scale.

The gripping device of the preferred embodiment shown in a perspective view in FIG. 2 includes two first tines 101 and 102 which are arranged at a fixed distance and a second tine 103 serving as a counter-element displaceable relative to the oppositely disposed first tines 101 and 102 in a movement plane disposed in the middle between the two first tines 101 and 102.

The second tine 103 is configured as a pressing jaw so that its contact surface 104 has a convex curvature in the direction of the first tines 101 and 102. On the side opposite the contact surface, the second tine 103 is connected with a push-pull rod 105 displaceably received in a pressure cylinder 106. Pressure cylinder 106 is disposed in an opening 107 in a gripper housing 108 and is connected with gripper housing 108 in such a manner that its end face (not visible here) terminates flush with a surface 109 of the gripper housing oriented in the direction toward second tine 103.

The two first tines 101 and 102 are configured as gripper rails, with their laterally facing surfaces being sloped in their upper region. The angle of inclination of the slope is configured differently depending on the material to be palletized. Beginning at the hinge joint, tines 101 and 102 are sloped in the direction toward the free end and, from the gripper rail surface oriented toward the second tine, in the direction toward the oppositely disposed gripper strip surface. The two first tines 101 and 102 are connected by way of hinge joints 110 and 111 with the ends of mutually parallel arranged fork rods 112 and 113. Hinge joints 110 and 111 are configured to be foldable within limits so that the two first tines 101 and 102 can be folded only in the direction of the second tine 103. The other ends of fork rods 112 and 113 are connected with one another by way of a bearing rod 114 which extends transversely to fork rods 112 and 113 and which is mounted in the manner of a hinge in gripper housing 108. On the side opposite first tines 101 and 102, as a continuation of hinges 110 and 111 of the two first tines 101 and 102, a transverse bar 115 is connected with fork rods 112 and 113. In the middle of transverse bar 115, at a rotatable hinge (not visible here) a lifting rod 116 is disposed. It extends in the direction toward a driving means or pressure cylinder 117 disposed at gripper housing 108 and ends displaceably therein. Pressure cylinder 117 is rotatably suspended in gripper housing 108 at a joint which is not visible here.

Between the two fork rods 112 and 113, a stripper 118 is disposed which runs parallel to the axis of movement of second tine 103 and is perpendicular to the plane defined by the two first tines 101 and 102 when they are not folded.

Gripper housing 108 is provided with a connecting rod 119 to which is attached a coupling 130 for a palletizing robot. Below the coupling 130, in the direction toward gripper housing 108, connecting rod 119 includes a rotating device (not visible here) for rotation relative to a vertical axis in the center of the connecting rod. Likewise below the coupling, connecting rod 119 is provided with a folding device (also not visible here) for folding relative to a horizontal axis below the rotating device. Thus, the gripping device can be rotated through at least 360° and can be folded in the direction of, opposite to, and laterally to the free ends of tines 101 to 103. Connecting rod 119 is disposed on the side of gripper housing 108 where pressure cylinder 106 is also disposed, and lies in the plane defined by the second tine 10 during its movement.

The illustration of FIG. 2 shows the movement axes of the gripper. Gripping or releasing of the gripper and thus picking up and depositing of stacks results in the following sequence of movements. The robot moves the gripper to the stack to be gripped in such a way that the first two gripper tines 101 and 102 are disposed below the stack and gripper tine 103 above the stack. The stack then also lies against stripper 118 and is simultaneously centered with respect to the two first tines 101 and 102 and second tine 103.

Then, the gripping device as a whole is raised and simultaneously the second tine 103 is pushed at twice the speed of the stroke of the gripping device, in the direction of the two first tines 101 and 102. Thus, tines 101, 102, and 103 simultaneously grip the stack. When a predetermined gripping pressure is reached as well as a predetermined curvature to stabilize the stack, a robot and/or a conveying device move the gripping device to the depositing location.

The gripping device is now turned about a revolute joint of the rotating device (not visible in the drawing) at connecting rod 119 into the desired depositing direction and is moved, by way of a lowering movement also transmitted by connecting rod 119, to a predetermined depositing height immediately above the intermediate member 200. Transverse rod 115, together with lifting rod 116 which enters into pressure cylinder 117, now swings fork rods 112 and 113 away from the stack into the opposite direction about the axis of bearing rod 114. Thus, the underside of the stack is able to be set down completely at the stacking location. In order to prevent damage to the intermediate members 200 by the two first gripper tines 101 and 02 when fork rods 112 and 113 swing back, the two first gripper tines 101 and 102 are folded upwardly about the axis of rotation passing through hinge-like joints 110 and 111.

The gripping device is also able to pick up the stack in a reversed manner in that the gripping device is turned about an axis so that the two first tines 101 and 102 are disposed above the stack and the second tine is disposed below the stack.

FIGS. 3a and 3b show in a cross-sectional view A—A and in a top view an intermediate member 200 of the embodiment according to the invention. In each case, the intermediate member 200 extends over an entire pallet and forms a support giving the gripper access in order to depalletize the individual stacks. Once an entire position has been cleared, the intermediate member is removed. It can be re-used and is provided, in particular, with the pieces of information necessary for access of the gripper, particularly regarding the palletizing pattern, so that depalletizing can be performed automatically as soon as the respective information has been read without the robot having to recognize the positions of the individual stacks. On the other hand, the coding of the intermediate members also provides the palletizing patterns for palletizing so that here again no further control measures are required. Each palletizing pattern merely requires a special type of intermediate members provided with the appropriate coding.

The intermediate member 200 is provided with raised portions 201 to 206, with raised portions 201 to 206 being configured in the shape of nubs. The gripper tines are able to move from the four side edges into the spaces between these nubs. The spacing and height of the nubs is adapted to the gripper tines. Nubs 201 to 206 on the upper side 207 have associated recesses on the underside 208 so that the intermediate members are stackable and nestable. Their surface is smooth so that the intermediate members can be transported by means of suction devices. The upper sides 207 of intermediate members 200 are provided with bar codes 209 in the middle between the nubs. The codes include information about the position of gripping device 100 and the sequence of the palletizing and depalletizing process and are read by a reading device disposed below gripper strip 102 during their entry. If the bar code is readable in the direction of gripper movement, additional drive means to generate a relative movement between the code and the scanning device can be omitted.

For the depalletizing of stacks, the intermediate members are a prerequisite. Tines 101 to 103 of gripping device 100 are moved toward the stack in such a way that the two first tines 101 and 102 are disposed below the stack and in the middle between respective nubs and the second tine 103 is disposed above the stack. Thus, the stack is disposed in the middle between the two first tines 101 and 102 and the second tine 103. The first tines grip underneath the stack S to be depalletized and are able to withdraw freely toward the top away from the intermediate member. The intermediate member 200 accordingly remains on the support and is removed after a stack layer S has been cleared. (The transporting process as a whole takes place according to the palletizing process described in connection with FIG. 1, beginning with picking up the stack to depositing the stack.)

The palletizing and depalletizing process has been illustrated in FIG. 1 between a longitudinal conveyor 40 and a pallet 60. However, the palletizing robot may also serve further stack pick-up and stack deposit positions of different processing machines. Moreover, it may be integrated into different manufacturing, binding, and shipping lines. Such a preferred possibility will be described in greater detail below with reference to FIGS. 4a and 4b. The palletizing robot according to the invention supplies and takes from a gather-stitcher or collector/stapler 70 shown here schematically. In the manner described in connection with FIGS. 1, 2 and 3 for stack pickup, the stack is picked up from a pallet 60 (not visible here) equipped with intermediate members 200 between its stack layers, by gripper tines 101 to 103 and is transported, according to FIG. 4a, in a coordinated movement of guiding device 7, rotating device 8, arm 6 and rotating device 10 to collector/stapler 70.

In the gather-stitcher or collector/stapler, the stacks are arranged in a position inclined with respect to the horizontal. Lifting rods 21 and 22 move gripping device 100 in the direction of lifting plate 23 by an amount equal to the amount by which the upper face 71 of the collector/stapler lies higher than the upper face of the stack layer. Gripping device 100 is mounted in a folding device 120 so that gripping device 100 is pivotal about a horizontally extending axis 121. Simultaneously with the lifting movement of lifting rods 21 and 22, gripping device 100 is pivoted about a horizontally extending axis 121 in the direction of the sides facing the free ends of the tines into the slope angle of the depository. Then, lifting rods 21 and 22 lower gripping device 100 in the direction toward the collector/stapler until the stack rests on the inclined upper face 72 of the collector/stapler. Then, gripper tines 101, 102, and 103 are released from the stack depository in the manner described in connection with FIG. 1.

The collector/stapler shown schematically in FIGS. 4a and 4b is merely an example of its use at a depositing or pick-up location for stacks to be transported. The supplying into, or the removal from the illustrated, inclined position may preferably also be effected in a fanned manner. The respective depositing or pick-up location is preferably also formed by a so-called crisscross laying device or a pressing station.

Figure 5:
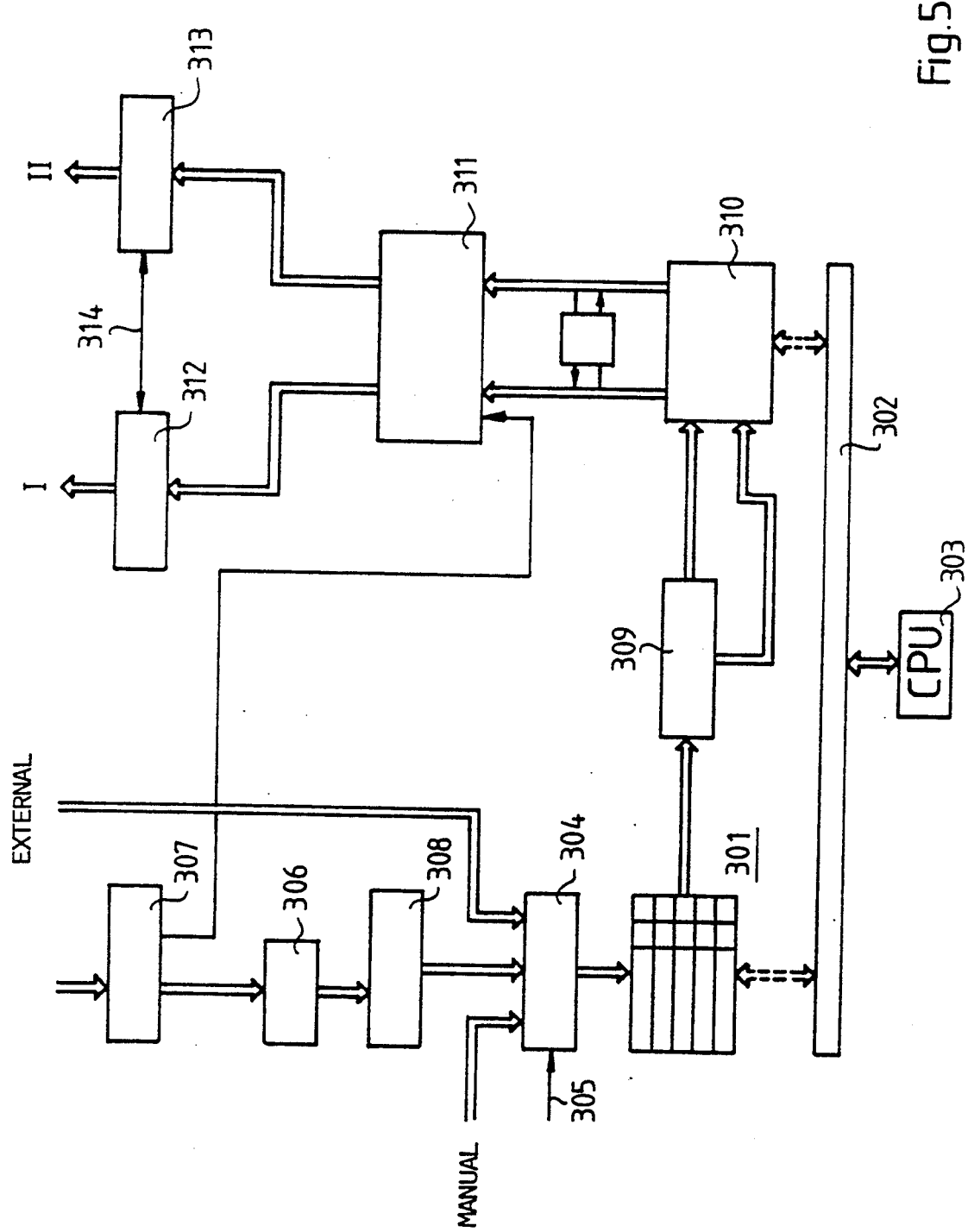

FIG. 5 shows the control of the palletizing robot according to the invention in the form of a block circuit diagram.

In a program memory 301, instructions for complete palletizing and depalletizing processes are stored as a sequence of transporting instructions. Each addressable memory region includes a succession of transporting instructions which are worked off sequentially when the respective memory region is addressed. These instructions include associated pieces of information made available by the selection of the access instructions. These pieces of information relate to the time at which the respective transporting instruction is to be performed, and in systems, in which several gripper arms can be utilized to perform the same transporting instruction, they serve to detect the association which definitely assigns the respective transporting instruction to a gripper arm or enables the extension of several or all gripper arms so that an optimum speed can be realized by exchanging tasks. The individual regions for the instruction sequences are illustrated symbolically by boxes in the block circuit diagram of memory 301. The associated pieces of information (small squares) are shown for each one of the instruction sequences shown vertically above one another in the form of rectangles. However, physically each individually addressable instruction sequence is composed of a sequence of instructions which are individually associated with the respective pieces of information.

Each instruction sequence is thus also associated with a palletizing scheme which, in its sequence of transporting instructions, gives information about the distribution of the material on the pallet during palletizing as well as during depalletizing. In this way, it is always possible, independently of the size and number of the stacks to be loaded, to obtain uniform packages which, in particular, go to the edges of the pallets so that a stable stack is produced. The same applies for the supply or removal of merchandise in production and storage regions.

By way of a bus 302, memory 301 is connected in a microprocessor or other computer system with a central processing unit (CPU) 303. The CPU performs the data transfers described below. For the sake of clarity, the respective connecting paths are shown directly in FIG. 5. In a programmable memory system, the respective data exchange, however, is also actuated by CPU 303 via bus 302.

The memory is addressed by way of a selector switch 304 which is equipped with various inputs that can be manually selected by way of an actuating element 305. In this connection, manual address input (left input channel) is initially possible in order to predetermine palletizing patterns for depalletizing or palletizing processes by way of direct switch actuation. Correspondingly, a remote input by remote data processing means or by a higher-order central system is possible through the right input channel.

The middle input channel is controlled by a code reader 306 having an associated scanner 307 connected with the gripper arm or its tines and which reads the code provided at a pallet or at an intermediate member and feeds it via a code address converter 308 to memory 301 for decoding the detected codes and output of the address of the associated instruction sequence. In this way, detection of the code results in the automatic selection of a corresponding transporting scheme which is forwarded via a buffer 309 to a block 310 for path optimization. The control signals for two grippers reach a "path guidance" block 311 which converts the individual transporting instructions into concrete control instructions for movement of the arms and gripper components. A first gripper I and a second gripper II are connected with path guidance block 311 by way of corresponding actuation circuits 312 and 313.

In order to coordinate and secure the gripper movements, a lock 314 is initially actuated so as to block coinciding overlapping of the gripper movements. A second gripper arm entering the range of movement during the performance of a transporting instruction is blocked until the first gripper has left the region. With this safety control it is possible to easily coordinate the movements of several grippers. However, in order to also produce time optimization, a "preview" feature is favorable which includes future gripper movements. Given that the gripper movements each take place according to a predetermined scheme, during the performance of a transporting instruction, the next instructions in the series are already loaded into buffer 309 which contains a separate shift register for each gripper, with their individual memory positions being separately addressable and changeable. Thus, this is a shift register whose characteristics go beyond those of corresponding commercially available integrated registers and is therefore realized in programmable-memory form.

Under consideration of the processing time information belonging to the individual transporting instructions, the overlap during future transporting instructions is calculated and, if such overlap is determined, a later instruction during which no overlapping takes place is given priority. For this, a further supplemental piece of information stored in connection with a transporting instruction must also be evaluated. It indicates the maximum number of steps by which a respective transporting step can be given priority to be performable. This may also include further conditions which may be important for processing. In practice, it will be easily possible during palletizing or depalletizing to give priority to a transporting instruction which relates to a stack that is included in the row presently being worked. In the coordinated performance of transporting tasks by two or more gripper arms, tasks of the one arm may here be transferred to the other arm in order to be able to compensate for favored time slots for one or the other arm occurring within the scope of the optimization process. For this purpose, those supplemental pieces of information are evaluated which relate to the association of the performance of transporting instructions by the one or the other arm.

The present invention is not limited in its embodiments to the above-described preferred embodiment. Rather, a number of variations are conceivable which take advantage of the described solution even for basically different configurations.

I claim:

1. A gripping device for transporting a stack of flexible sheets, comprising:
   two substantially horizontally spaced, parallel tines arranged for supporting the stack; said two tines defining a horizontally extending spacing therebetween;
   a bearing shaft disposed near said two tines and defining a horizontal rotation axis;
   two fork rods disposed between said bearing shaft and said two tines; said two fork rods having first and second ends, each said fork rod being rotatably attached at its first end to respective ones of said tines, and each said fork rod being attached at its second end to said bearing shaft;

a counterelement supported above the tines in alignment with the horizontal spacing therebetween; said counterelement having a horizontal dimension in a direction parallel to the horizontal spacing between the two tines, said horizontal dimension being smaller than the horizontal length of said spacing between said two tines; and means for moving said counterelement substantially vertically towards or away from said two tines, whereby, when an unstabilized stack of flexible sheets is received on said two tines and said counterelement is moved towards said two tines for gripping and stabilizing the stack therebetween, said counterelement and said two tines produce a curvilinear bending in the stack about a horizontal axis oriented parallel to said two tines when said counterelement is moved past an initial plane containing a top layer of the unstabilized stack.

2. A gripping device as recited in claim 1, further comprising driving means for moving said two tines towards said counterelement, and control means for simultaneously actuating said driving means and said counterelement moving means during gripping and releasing of a stack for concurrently moving said two tines and said counterelement towards one another and away from one another, respectively.

3. A gripping device as recited in claim 2, wherein said horizontal rotation axis extends above said tines perpendicularly thereto.

4. A gripping device as recited in claim 3, wherein each one of said two tines has first and second ends, said second end being a free end; further comprising an abutment means extending in a direction towards said rotation axis and being disposed adjacent the respective first ends.

5. A gripping device as recited in claim 1, further comprising hinge means between said two tines and said two fork rods for causing said two tines to be oriented normally horizontally and for allowing said two tines to rotate only above the horizontal from the horizontal toward and away from said counterelement.

6. A gripping device as recited in claim 1, said counterelement is a pressing jaw, and said horizontal dimension of said counterelement is greater than a horizontal width dimension of each one of said two tines.

7. A gripping device as recited in claim 6, wherein said counterelement has a contact surface defined on an underside thereof facing said two tines and a cylindrical axis, said contact surface is cylindrically convexly rounded in the vertical downward direction, and the cylindrical axis of said counterelement is substantially parallel to a length dimension of said two tines.

8. A gripping device as recited in claim 1, wherein the cross section of each said tine defines a slope, and each slope substantially faces the other one of said two tines as well as said counterelement.

9. A gripping device as recited in claim 8, wherein each one of said two tines has a free end; said cross section decreasing toward said free end of each tine.

10. A gripping device as recited in claim 1, further comprising a quick release coupling disposed stationary relative to said bearing shaft.

11. A gripping device as recited in claim 1, wherein said two fork rods extend substantially perpendicularly relative to said two tines.

12. A gripping device as recited in claim 1, further comprising a stripper means disposed stationarily relative to said bearing shaft for stripping off a stack of flexible sheets when said two fork rods rotate about said horizontal rotation axis.

* * * * *